March 26, 1940.  J. GLÜCK  2,194,790

ARTIFICIAL TOOTH AND CROWN OF TOOTH

Filed April 26, 1938

INVENTOR
JENŐ GLÜCK
BY
Richards & Geier
ATTORNEYS

Patented Mar. 26, 1940

2,194,790

UNITED STATES PATENT OFFICE 2,194,790

ARTIFICIAL TOOTH AND CROWN OF TOOTH

Jenö Glück, Budapest, Hungary

Application April 26, 1938, Serial No. 204,300
In Hungary April 27, 1937

1 Claim. (Cl. 32—12)

The invention relates to an artificial tooth or crown of a tooth, having a much greater firmness and durability than the teeth of this kind known heretofore and providing a stronger fixing and easier fitting in the mouth.

The invention consists substantially in that on the artificial teeth or crowns of a tooth, covered by enamel, porcelain or other material similar to the natural teeth, is firmly attached—under the layer of porcelain, a metallic cap clasping the stump of the tooth, which cap adheres so strongly to the layer of porcelain and makes it so stiff, that the firmness of the teeth and crowns of teeth is considerably increased. Furthermore, a crown of this kind can be easier and better fixed to the stump, because the inner surface of the layer of hardporcelain is rough since the metallic cap and the sticking-cement adhere better to it.

It was proposed to apply to bridges consisting of several artificial teeth, for the purpose of increasing the resistance against pull and pressure of the whole artificial set of teeth, a stifting inlay of an alloy of platin-iridium extending from one support-tooth to the other.

This inlay was made in that manner, that a separate, prismatic (f. i., triangular) porcelain-inner-part was clasped by a longitudinal armature, and the ends of the longitudinal wires projecting from the inner part of the porcelain were attached to the two support-teeth, whilst the other teeth of the bridge were burned into the stifting inlay consisting of the porcelain-inner-part and the armature. This way of stiftening the bridges has been very complicated and has—beside the expensive manufacturing—the disadvantage, that, even in the case of a slight imperfection in one part of the bridge, the whole bridge had to be removed. The present invention, on the other hand, provides a simple and low-priced manufacturing of each tooth or crown in the bridge, with the further advantage, that when necessary, any part can be exchanged simply and quickly by fitting in the mouth, without affecting the other parts.

Embodiments of the invention are illustrated by way of example in the accompanying drawing.

Figure 1:
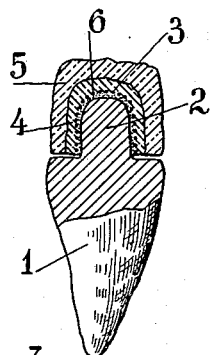
Fig. 1 is a section of a tooth covered with a crown made according to the invention.
Figure 2:
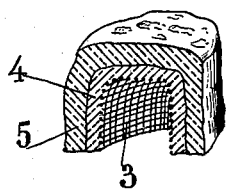
Fig. 2 is a perspective section showing a crown of a tooth made according to the invention.
Figure 5:
Figs. 5 and 6 are perspective images of two forms of a metallic net-cap made according to the invention.

In the embodiment of the invention illustrated in Fig. 1, the upper part of the tooth 1 has been ground off to form the stump 2. The stump of the tooth is covered by a metallic cap made of a net which—before the fitting in the mouth—was burned into a layer of hard-porcelain 4, which is covered by a layer of enamel or coloring matter 5. The formation of the articulation in the upper layer is done in a known manner. The metallic cap 3 is illustrated in a perspective view in Fig. 5. The crown of the tooth is represented in section in Fig. 2. The crown set on the metallic cap 3 is fixed by a layer of cement 6 to the stump 2 of the tooth.

Figure 3:
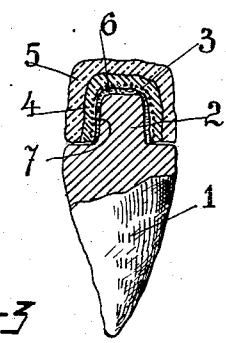
Fig. 3 shows a further form of the crown of a tooth made according to the invention.

Fig. 3 shows a form of the invention in section, wherein the stump 2 of the tooth is covered by a smooth metallic cap 7, fixed by the layer of cement 6, to which cap the metallic net-cap 3 made according to the invention is soldered or welded before the layer of porcelain 4, 5 is burned onto the cap 3.

Figure 4:
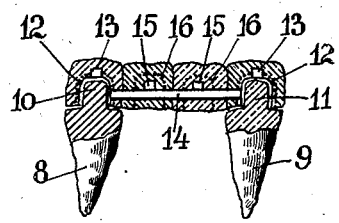
Fig. 4 shows in section a bridge consisting of four members.
Figure 6:
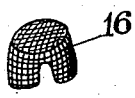

Fig. 4 illustrates a bridge of four members in section. To the stumps 10 and 11 of the supporting teeth 8 and 9 are glued in a manner known per se, the metallic caps 12, having projecting plugs 13. The two metallic caps 12 are connected by a metallic splint, having projecting plugs 15. To the plugs are fixed metallic net-caps 16, as represented in Fig. 6, and the layers of porcelain or enamel are applied by heat over the caps. The fixation of the bridge in the mouth is done by pasting the two support crowns. An advantage of the bridge of this kind is—beside a stronger structure—that in case one member is damaged, this member may be easily replaced by a new one, without the necessity of removing the whole bridge; this has not been possible heretofore. The porcelain-cover may be ground off in case of repair, till the metallic plug 15 appears, to which the new-made tooth-member can be pasted without difficulties, as well as the crowns hitherto known.

The metallic net-cap may be made of a material, for instance platin, which withstands the temperatures necessary for the burning of the porcelain.

What I claim is:

An artificial crown for teeth or bridges comprising an outer layer of porcelain enamel, a metallic mesh net cap, a similar metallic foil cap, said metallic parts being soldered or welded together at the outer surface of said foil part, said porcelain layer being fused by burning or baking to the outer surface of said mesh netcap, the inner surface of the metallic foil cap being adapted to be secured to a tooth stump by means of cement.

JENÖ GLÜCK.